July 27, 1965  D. R. PIATT ETAL  3,196,636
SEALING DEVICE FOR POWER TOOL
Filed May 15, 1963  5 Sheets-Sheet 1

INVENTORS
DONALD R. PIATT
CHRISTOPHER K. BROWN
BY
ATTORNEY

INVENTORS
DONALD R. PIATT
CHRISTOPHER K. BROWN
BY
ATTORNEY

July 27, 1965   D. R. PIATT ETAL   3,196,636
SEALING DEVICE FOR POWER TOOL
Filed May 15, 1963   5 Sheets-Sheet 5

INVENTORS
DONALD R. PIATT
CHRISTOPHER K. BROWN
BY
ATTORNEY 3,196,636
SEALING DEVICE FOR POWER TOOL
Donald R. Piatt, Bernardsville, N.J., and Christopher K. Brown, Camp Hill, Pa., assignors to Ingersoll-Rand Company, New York, N.Y., a corporation of New Jersey
Filed May 15, 1963, Ser. No. 280,647
9 Claims. (Cl. 64—26)

The present invention relates to impulse tools and more particularly to an improved sealing device for such an impulse tool.

Heretofore, impulse tools have been of the type disclosed in U.S. application Serial No. 158,838, filed December 12, 1961 by D. K. Skoog, now Patent No. 3,116,617, and, in U.S. patent application Serial No. 244,151, filed December 12, 1962, by D. K. Skoog et al. and assigned to the same assignee as the present application. In the last named patent application a through type spindle blade is disclosed to provide two impulses during each revolution of the rotating means in the impulse tool. In order to provide one impulse per revolution of the rotating means of such impulse tool a gating slot in the through type spindle blade is disclosed, which gating slot permits leakage of the fluid from the high pressure portion (of the eccentric cavity in the inner housing) to the low pressure portion with attendant loss of impulse power. During the impulsing action the high pressure cocks the conventional through type spindle blade in the spindle blade slot so that some leakage of fluid passes from the high pressure portion through the gating slot and into the low pressure portion.

It is the general object of the present invention to avoid and overcome the foregoing and other difficulties of and objections to prior art practices by the provision of an improved sealing device for an impulse tool having a through type spindle means which sealing device increases the impulse power of the impulse tool, provides only one impulse per revolution of the rotating elements of the impulse tool, substantially eliminates leakage of the fluid from the high pressure portion (of the cavity in the inner housing) to the low pressure portion during the impulsing action, and eliminates the conventional gating slot in the spindle blade.

The aforesaid objects of the present invention, and other objects which will become apparent as the description proceeds, are achieved by providing an improved sealing device for an impulse tool for applying a predetermined torque to an object and having a housing means adapted to contain a fluid, spindle means in the housing means and in the fluid, drive means operatively associated with one of the housing means and the spindle means for causing relative rotary movement between the housing means and the spindle means, the other of the housing means and the spindle means being adapted to engage the object. The sealing device comprises land means disposed in the housing means, and a through type spindle blade in the spindle means and engageable with the land means once during each revolution of the relative rotary movement to dynamically seal off a portion of the fluid so that the pressure in the portion increases thereby causing the other of the housing means and spindle means to rotate with respect to the one and to apply a torque to the object. One of the land means and the spindle blade is offset from a centerline of the one.

In addition the sealing device is employed as a source of fluid impulses wherein one of the housing means and the casing means is connected to a stationary casing means and fluid impulses generated in the housing means are transmitted by passage means in one of the housing means and the spindle means to a conventional tool.

For a better understanding of the present invention reference should be had to the accompanying drawings, wherein like numerals of reference indicate similar parts throughout the several views and wherein.

Although the principles of the present invention are broadly applicable to sealing devices for fluid operated power tools the present invention is particularly adapted for use in conjunction with impulse tools utilized as impulse wrenches and as sources of fluid impulses and hence it has been so illustrated and will be so described.

Figure 1:
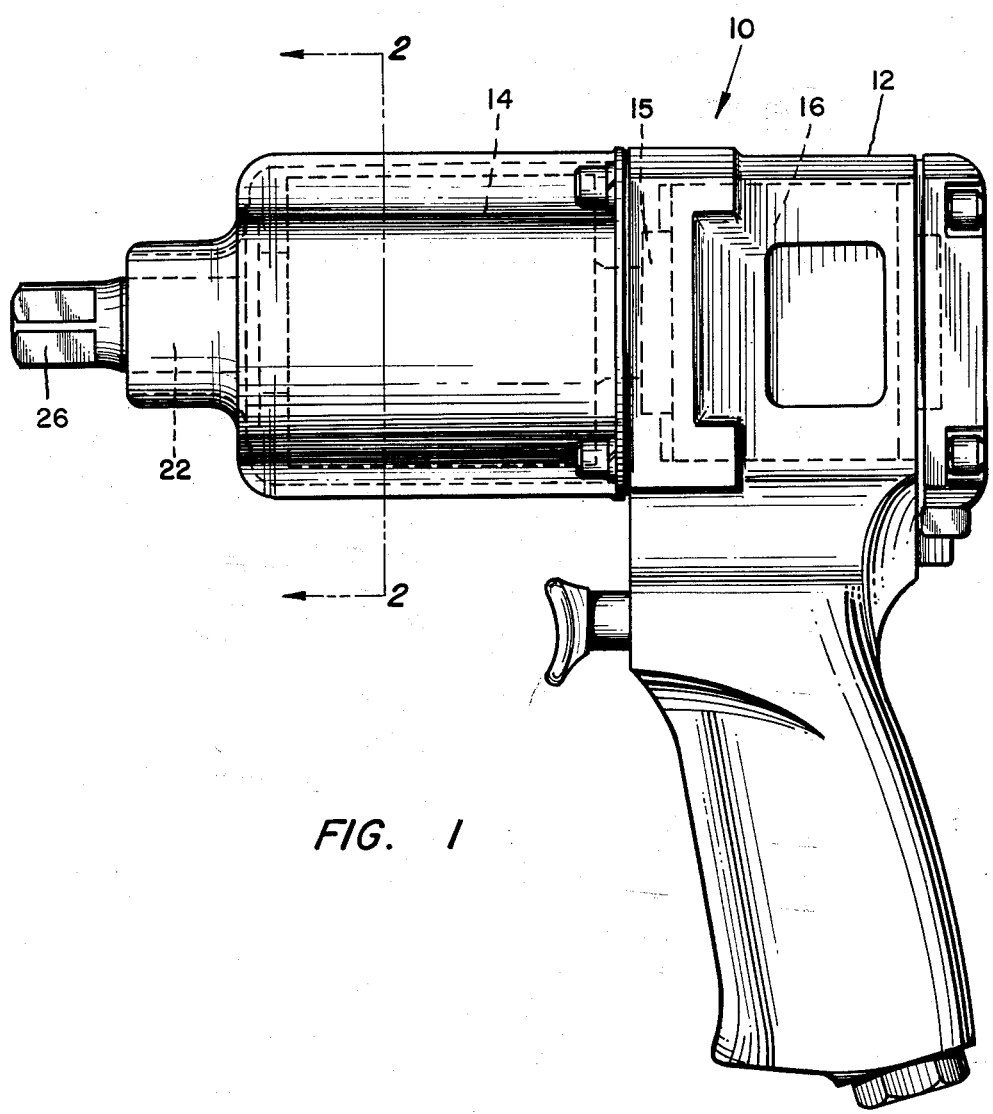
FIG. 1 is a longitudinal view of an impulse tool incorporating the improved sealing device of the present invention provided with offset seal points and showing the housing means as the driven rotating member.
Figure 2:
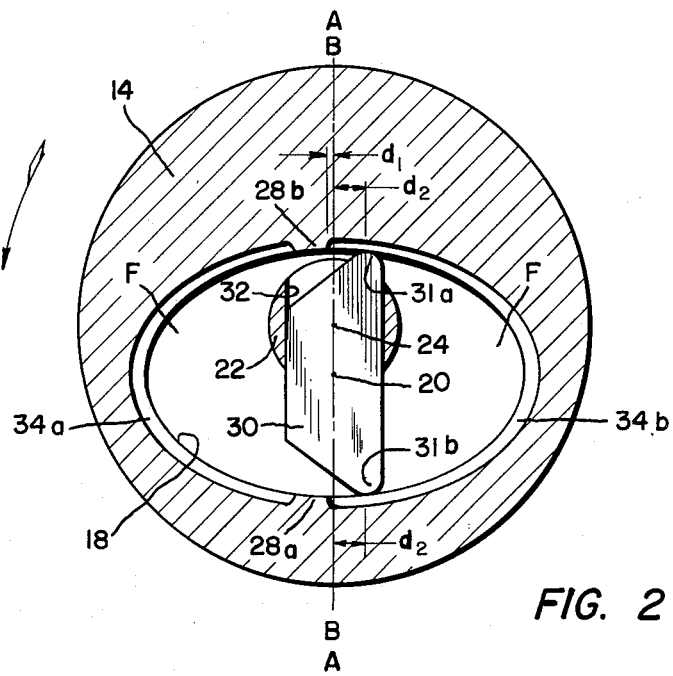
FIG. 2 is a horizontal sectional view along the line 2—2 of FIG. 1 in the direction of the arrows showing the position of the land means and spindle blade about 180° before the impulsing action begins with the width of the land means the offset distances and the length of the spindle blade distorted and magnified for clarity and illustrative purposes.

With specific reference to the form of the present invention illustrated in the drawings, and referring particularly to FIGS. 1 and 2, an impulse tool of the type disclosed in the above mentioned U.S. patent application Serial No. 244,151 is indicated generally by the reference numeral 10.

Since the impulse tool 10 per se forms no part of the present invention it is deemed sufficient to say that such impulse tool 10 has a casing means, such as the outer casing 12 (FIG. 1), and a housing means, such as the inner housing 14 (FIGS. 1–6). This inner housing 14 is rotatable, within the outer casing 12 (by means of a coupling means 15, FIG. 1) by a drive means, such as the air motor 16 or the like, and is adapted to contain a fluid, such as the oil F (FIGS. 2–6), within an eccentric substantially elliptically (as shown) or limicon shaped or circular cavity 18, the center of which cavity 18 is at 20 (FIGS. 2–6). A spindle means, such as the spindle 22 (FIGS. 1–6), is rotatably mounted in the inner housing 14 and in the oil F. The center of rotation of the inner housing 14 and of the spindle 22 is at 24. The spindle 22 carries a square drive 26 (FIG. 1) adapted to carry a socket (not shown) which socket (not shown) engages a threaded fastener (not shown). The air motor 16 is operatively associated with one of either the inner housing 14 or spindle 22 (in the showing of FIG. 1 the inner housing 14) for causing relative rotary movement between the inner housing 14 and the spindle 22. The other of the inner housing 14 and spindle 22 (in this case the spindle 22) is adapted to engage the threaded fastener (not shown) by means of the square drive 26.

Sealing device

Referring now to FIG. 2 land means, such as the lands 28a and 28b, are disposed in substantially chordal spaced relationships a distance "$d_1$" from the centerline "AA" of the spindle 22 or the centerline "BB" of the cavity 18, which centerlines "AA" and "BB" are coincident in FIG. 2. A through type spindle blade 30 (FIGS. 2–6) is reciprocable in a blade slot 32 in the spindle 22 and engages the lands 28a and 28b during the impulsing operation by means of offset seal points 31a and 31b on the spindle 22, which seal points 31a, 31b are disposed a distance "$d_2$" from the centerline "AA" of the spindle 22 and spindle blade 30, which centerline "AA" coincides in FIG. 2 with the centerline "BB" of the cavity 18. Bypass slots 34a and 34b (FIGS. 2–6) are provided in the inner housing 14 between the lands 28a and 28b to permit equalization of oil flow before and after impulsing. The offset seal points 31a and 31b permit the elimination of the conventional gating slot in the spindle blade 30.

It will be understood that the improved sealing device will function properly if one of either the lands 28a, 28b or the seal points 31a, 31b is offset from the respective centerlines "BB" and "AA" and the other is not offset therefrom.

Figure 3:
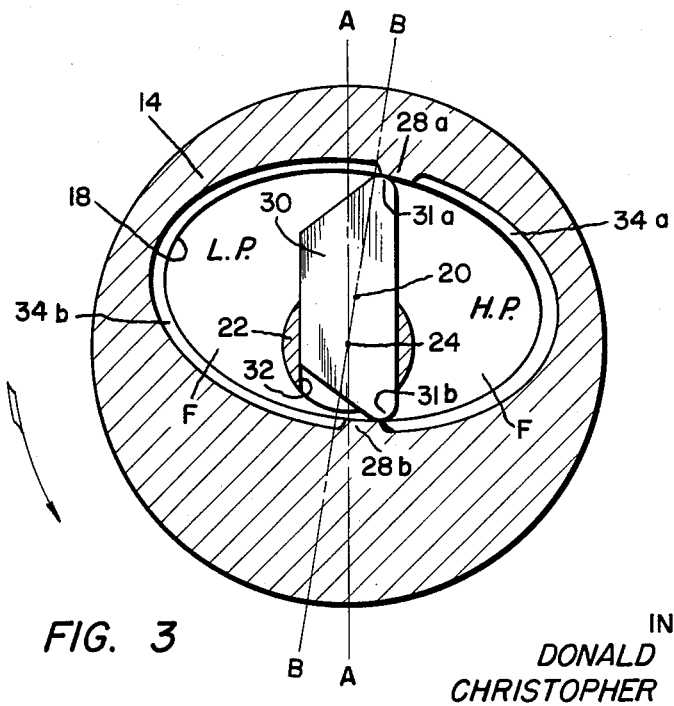
FIG. 3 is a view similar to FIG. 2 showing the position of the land means and spindle blade at the start of the impulsing action.

As the inner housing 14 rotates in counter clockwise direction, as shown by the arrow in FIG. 2 (about 180°) from the position shown in FIG. 2 to the position shown in FIG. 3 the seal points 31a and 31b engage respectively the lands 28a and 28b to dynamically seal off the cavity 18 into a low pressure portion LP and a high pressure portion HP. Centerline "BB" (FIG. 3) indicates the centerline of the cavity 18. During movement of the inner housing 14 from the position shown in FIG. 3 to the position shown in FIG. 4 the fluid pressure in the high pressure portion HP increases thereby causing the spindle blade 30 to be impulsed in counter clockwise direction through the angle $\theta_1$ defined by the new centerline "A⁴—A⁴" and the old centerline (FIG. 3) namely "A—A."

The fluid pressure in high pressure portion HP (FIG. 4) wedges or cocks the spindle blade 30 slightly against the blade slot 32 at points 36 and 38 thereby eliminating leakage of oil F from the high pressure portion HP to the low pressure portion LP through the blade slot 32.

Figure 4:
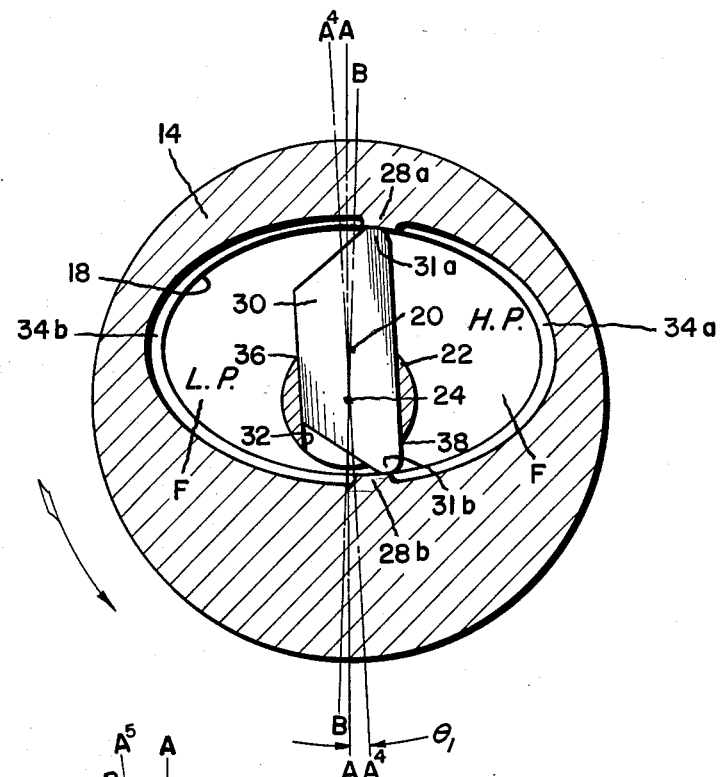
FIG. 4 is a view similar to FIGS. 2-3 showing the position of the land means and spindle blade at the middle of the impulsing action.
Figure 5:
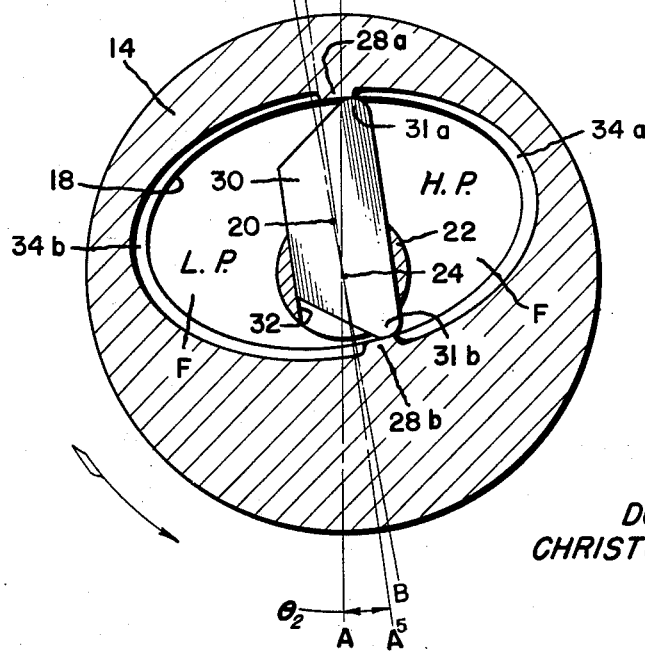
FIG. 5 is a view similar to FIGS. 2-4 showing the position of the land means and spindle blade at the end of the impulsing action.

During rotary movement of the inner housing 14 from the position shown in FIG. 4 to the position shown in FIG. 5 the spindle blade 30 is further rotated through the complete impulse angle $\theta_2$ defined by the new centerline "A⁵—A⁵" and the old centerline (FIG. 3) "A—A."

Figure 6:
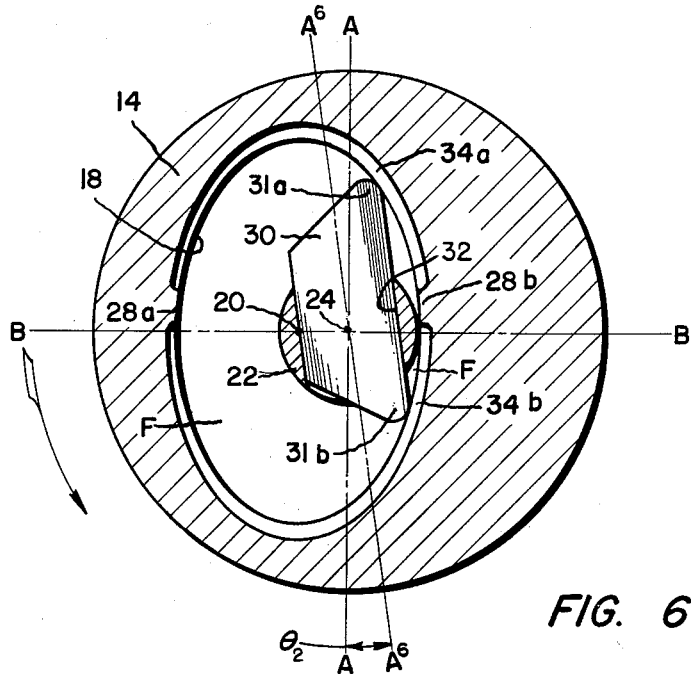
FIG. 6 is a view similar to FIG. 2-5 showing the position of the land means and spindle blade about 90° beyond the end of the impulsing action.

Thereafter the inner housing 14 moves from the position shown in FIG. 5 to the non impulsing position shown in FIG. 6 where it will be noted the spindle blade 30 clears the walls of the substantially elliptically or limicon shaped cavity 18.

In a typical construction of the impulse tool the following distances are representative by way of example but not limiting:

$d_1 = .020''$
$d_2 = .016''$
Width of land 28a = .070"
Width of land 28b = .020"

Alternative embodiments

Figure 7:
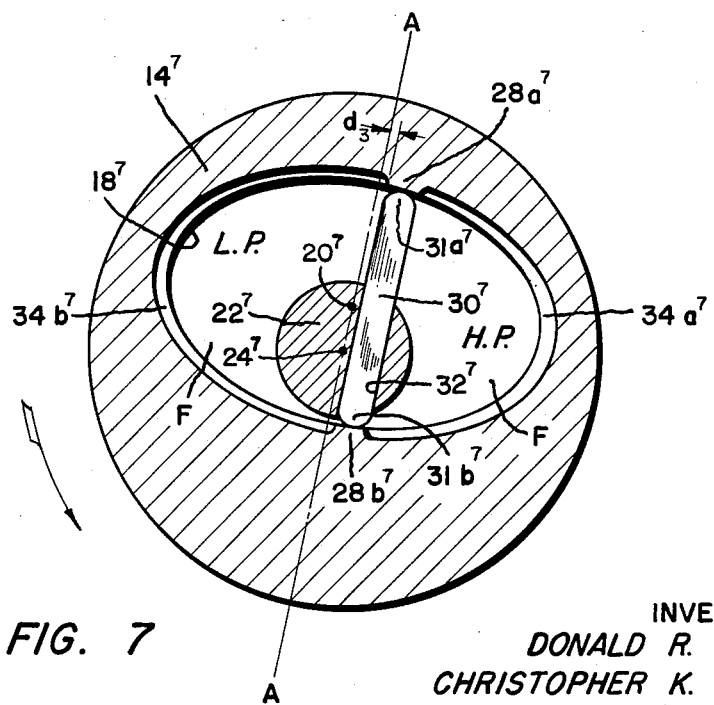
FIG. 7 is a view similar to FIG. 4 of an alternative embodiment of the spindle blade, namely an offset spindle blade.
Figure 8:
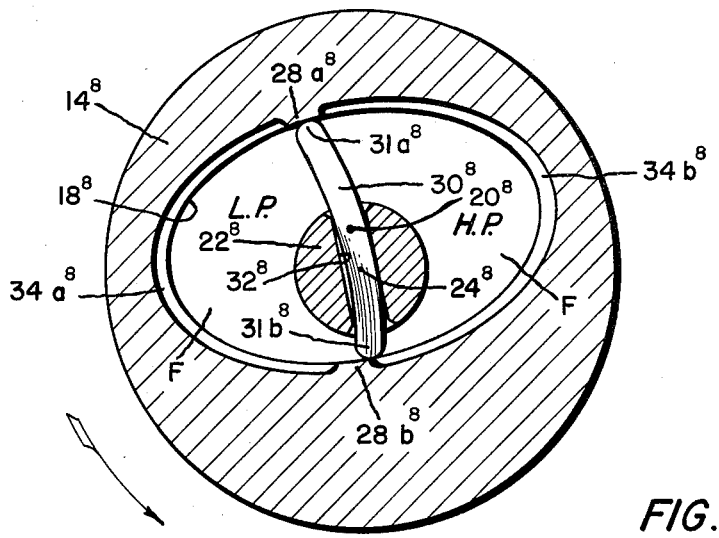
FIG. 8 is a view similar to FIGS. 4 and 7 of another alternative embodiment of the spindle blade, namely a concave arcuate spindle blade.
Figure 9:
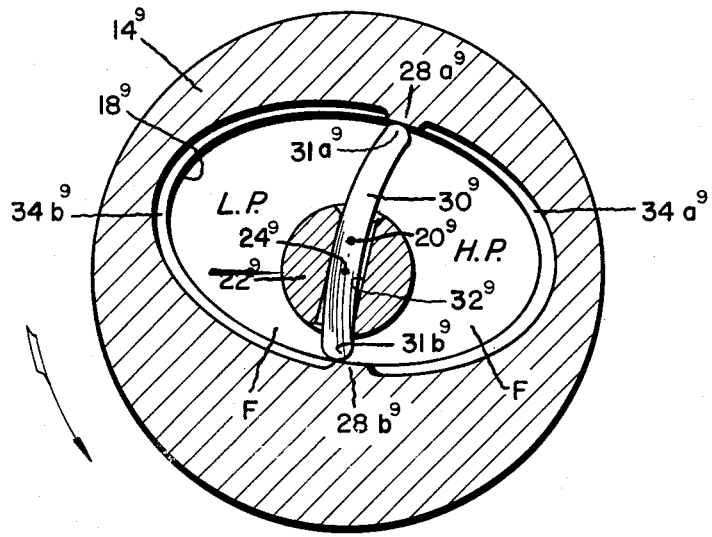
FIG. 9 is a view similar to FIG. 4, 7 and 8 of a further alternative embodiment of the spindle blade, namely a convex arcuate spindle blade.

It will be understood by those skilled in the art that alternatively as shown in FIG. 7 the spindle blade 30⁷ is disposed a distance "$d_3$" (for example .020") from the centerline AA of the spindle 22. In FIGS. 8 and 9 a concave arcuate spindle blade 30⁸ and convex arcuate spindle blade 30⁹ are employed.

It will also be understood by those skilled in the art from the above description and reference to the above mentioned U.S. Patent No. 3,116,617 and U.S. patent application Serial No. 244,151 that the improved sealing device of the present invention is used in impulse tools, employed either as an impulse wrench or as a source of fluid impulses.

It will be recognized by those skilled in the art that the objects of the present invention have been achieved by providing an improved sealing device for an impulse tool, which sealing device increases the impulse power of the tool, provides only one impulse per revolution of the rotating elements of the impulse tool, substantially eliminates leakage of the fluid from the high pressure portion to the low pressure portion during the impulsing action and eliminates the conventional gating slot in the spindle blade.

While in accordance with the patent statutes preferred and alternative embodiments of the present invention have been illustrated and described in detail, it is to be particularly understood that the invention is not limited thereto or thereby.

We claim:

1. A sealing device for an impulse tool for applying a predetermined torque to an object and having a housing means adapted to contain a fluid, spindle means in said housing means and in said fluid and drive means operatively associated with one of said housing means and said spindle means for causing relative rotary movement between said housing means and said spindle means, the other of said housing means and said spindle means being adapted to engage said object, said sealing device comprising:
   (a) land means disposed on said housing means and
   (b) a through type spindle blade in said spindle means and engageable with said land means once during each revolution of said relative rotary movement to dynamically seal off a portion of said fluid so that the pressure in said portion increases thereby causing the other of said housing means and said spindle means to rotate with respect to said one and to apply a torque to said object,
   (c) one of the land means and the spindle blade being disposed in spaced relationship from an axis of symmetry of said housing means and a longitudinal axis of said spindle means, respectively.

2. The sealing device recited in claim 1 wherein said through type spindle blade is disposed in said spindle means in spaced relationship from the centerline of said spindle means.

3. The sealing device recited in claim 1 wherein said through type spindle blade is straight.

4. The sealing device recited in claim 1 wherein said through type spindle blade is arcuate.

5. The sealing device recited in claim 1 wherein said through type spindle blade is concave.

6. The sealing device recited in claim 1 wherein said through type spindle blade is convex.

7. The sealing device recited in claim 1 wherein said through type spindle blade is disposed on the centerline of said spindle means, said through type spindle blade having seal points which are disposed in spaced relationship from the longitudinal axis of said spindle means.

8. A sealing device for an impulse tool for applying a predetermined torque to an object and having a housing means adapted to contain a fluid, spindle means in said housing means and in said fluid and drive means operatively associated with said housing means for causing relative rotary movement between said housing means and said spindle means, said spindle means being adapted to engage said object, said sealing device comprising:
   (a) land means disposed on said housing means, and
   (b) a through type spindle blade in said spindle means and engageable with said land means once during each revolution of said rotary movement of said housing means to dynamically seal off a portion of said fluid so that the pressure in said portion increases thereby causing said spindle means to rotate with respect to said housing means and to apply to a torque to said object, (c) one of the land means and the spindle blade being disposed in spaced relationship from an axis of symmetry of said housing means and a longitudinal axis of said spindle means, respectively.

9. A sealing device for an impulse tool for applying a predetermined torque to an object and having a housing means adapted to contain a fluid, spindle means in said housing means and in said fluid and drive means operatively associated with said spindle means for causing relative rotary movement between said housing means and said spindle means, said housing means being adapted to engage said object, said sealing device comprising:
   (a) land means disposed on said housing means, and
   (b) a through type spindle blade in said spindle means and engageable with said land means once during each revolution of said spindle means to dynamically seal off a portion of said fluid so that the pressure in said portion increases thereby causing said housing means to rotate with respect to said spindle means and to apply to a torque to said object,
   (c) one of said land means and said spindle blade being disposed in spaced relationship from an axis of symmetry of said housing means and a longitudinal axis of said spindle means, respectively.

References Cited by the Examiner
UNITED STATES PATENTS

| | | | |
|---|---|---|---|
| 1,700,417 | 1/29 | Ney et al. | 192—58 |
| 2,034,702 | 3/36 | McClelland | 192—58 |
| 2,242,734 | 5/41 | Whittlesey | 192—58 |
| 2,247,410 | 7/41 | Ross | 192—58 |
| 2,371,081 | 3/45 | Tucker et al. | 64—26 |
| 2,821,143 | 1/58 | Pettibone. | |
| 3,116,617 | 1/64 | Skoog | 64—26 |

ROBERT C. RIORDON, *Primary Examiner.*